Dec. 14, 1965  J. H. PEREUE ETAL  3,222,794
WHEEL ALINEMENT INDICATOR
Filed July 26, 1961  3 Sheets-Sheet 1
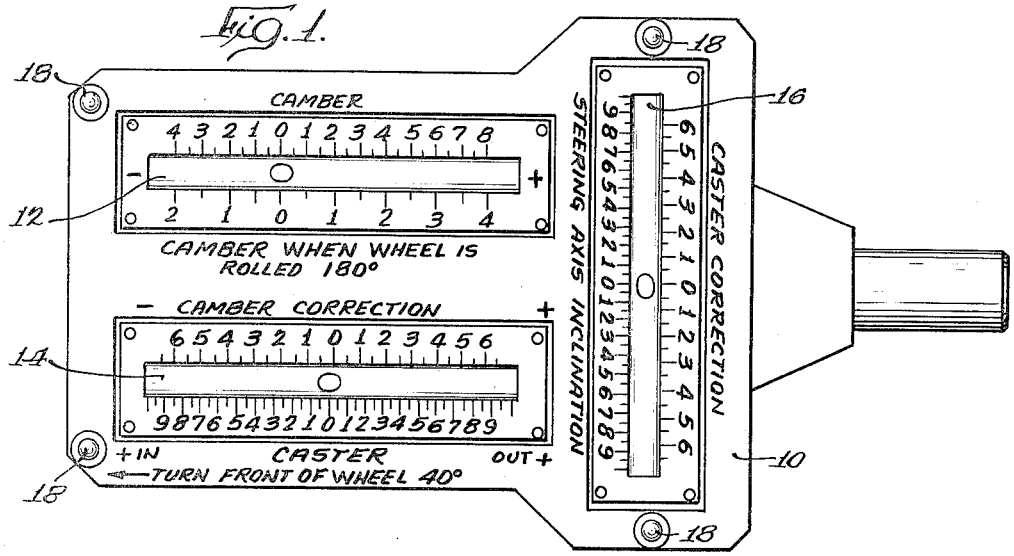
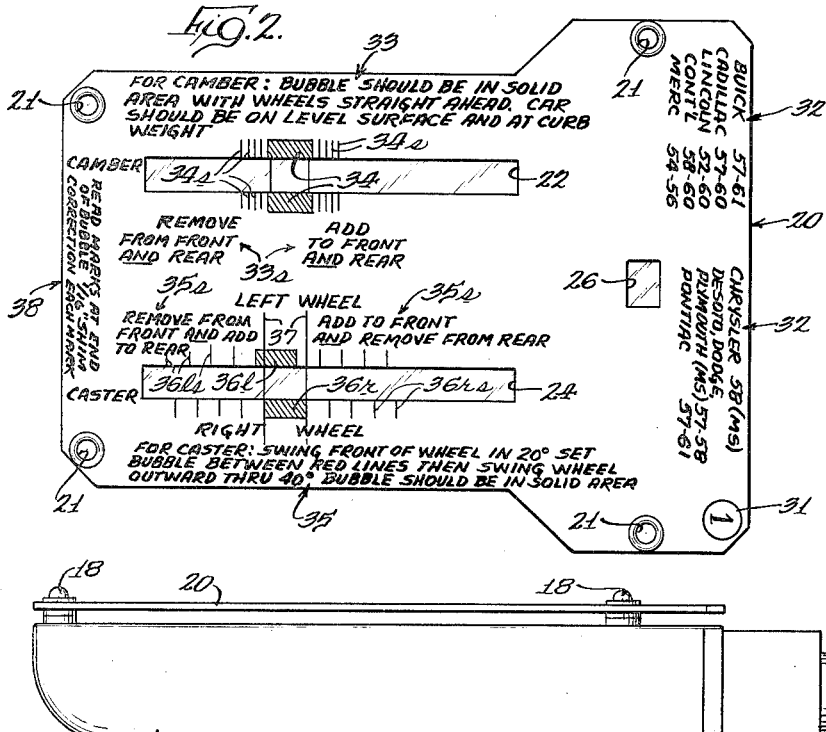

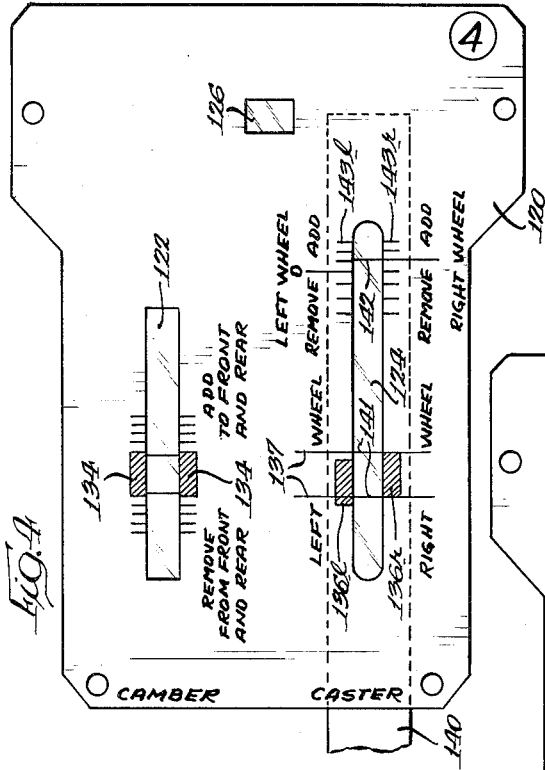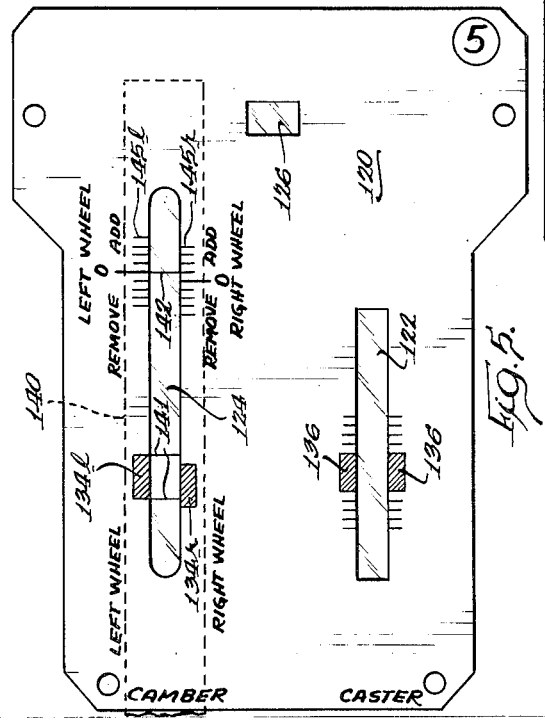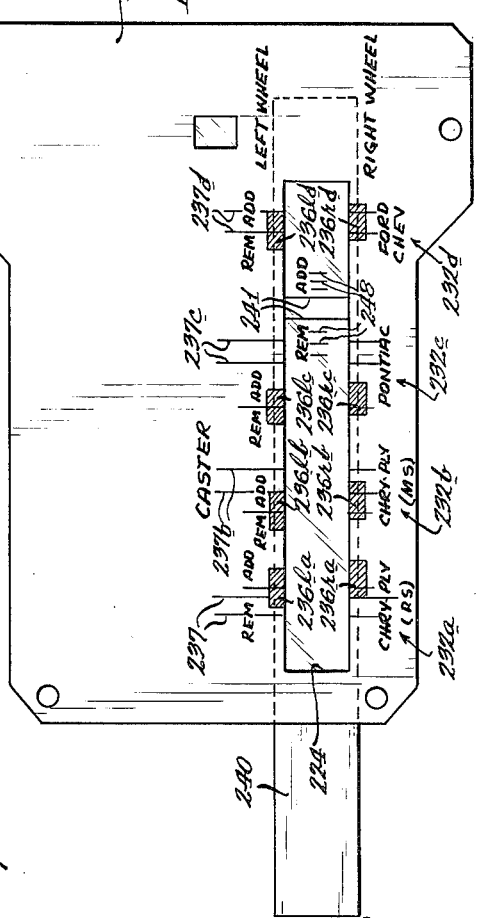

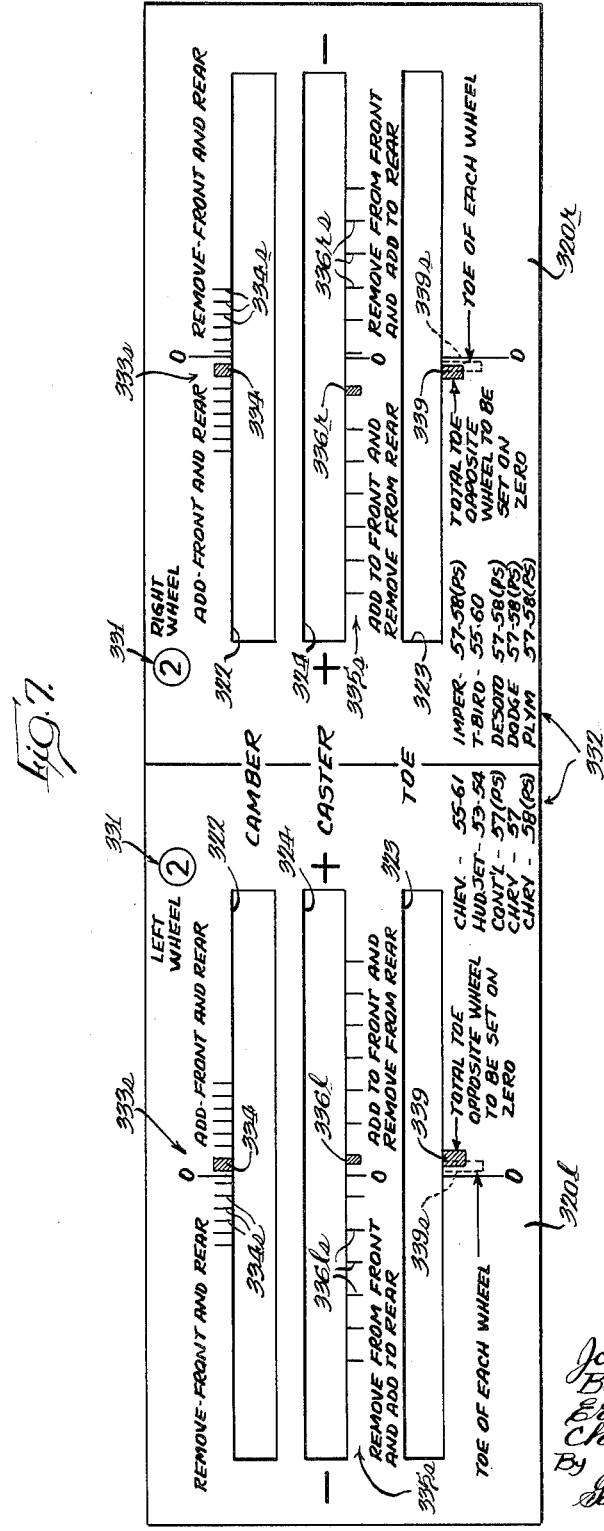

United States Patent Office 3,222,794
Patented Dec. 14, 1965

3,222,794
WHEEL ALINEMENT INDICATOR
Joseph H. Pereue and Bert F. Abbott, Rock Island, Ernest Miles Bacon, Milan, and Charles W. MacMillan, Rock Island, Ill., assignors to Bear Manufacturing Company, Rock Island, Ill., a corporation of Delaware
Filed July 26, 1961, Ser. No. 127,053
7 Claims. (Cl. 33—203.18)

The present invention relates to the art of determining and/or correcting the alinement criteria of vehicle wheels, especially the steering wheels of automobiles and trucks, and is particularly concerned with indication of the criteria in clear and lucid correlation with the specifications of the vehicle manufacturers.

The geometry of vehicle steering wheels is carefully calculated and adjusted by the manufacturers of the vehicle to impart to the vehicle the particular steering characteristics deemed to be best for a given vehicle. The geometric relationships are well-known and comprise caster, camber, steering axis inclination, toe-in and turning radius. [Each manufacturer carefully adjusts each of these criteria and establishes specifications for the same. Because of variations in vehicle weight, wheel base, tire size, suspensions, etc., and in light of the latitudes within which wheel suspension engineers may operate, these specifications vary from year-to-year, from fanufacturer-to-manufacturer, from division-to-division within respective automotive companies, and even models in a given brand line.

To determine the alinement of the steering wheels of vehicles, it has been necessary heretofore to consult a master chart giving the specifications for all vehicles (some 250 entries for passenger cars and some 650 entries for trucks) to extract from the chart the specifications for the particular vehicle to be tested, i.e., camber, caster, steering axis inclination, toe-in and turning radius for the particular year, make and model of vehicle. Camber, caster, steering axis inclination (or king pin inclination) and turning radius are given in degrees, and toe-in in inches. After ascertaining the factory specifications, conventional apparatus (such as spirit level gauges, pendulum operated gauges, protractors, projected light beam devices, turning radius gauges, toe-in bars, etc.) would be employed in known manner to ascertain the actual geometry of the steering wheels of the vehicle, and the actual readings, in degrees and inches, would then be compared by the mechanic to the specifications.

The criteria of steering wheel alinement are difficult for the uninitiated to understand, and the checking of five separate factors has been complex and confusing for novice mechanics. Even the experienced operator or mechanic, though knowledgeable, is faced with a complex task in ascertaining factory specifications and checking each. Also, in attempting to point out to vehicle owners variations between factory specifications and actual readings, the mechanic has been handicapped by the fact that, to the average motorist, caster, camber, steering axis inclination, turning radius and toe-in are abstract concepts, the importance of which he seldom appreciates. He is reluctant to consider and apprehensive of a subject he does not understand. He is not disposed to check the master chart or observe the readings taken, as they are meaningless to him. If he is told his car wheels are out of alinement, he accepts, suspiciously, the word of the mechanic. Usually he orders the defect corrected, but with misgivings.

The object of the present invention is to simplify the understanding of wheel alinement for the motorist, the beginner or novice mechanic and the skilled operator, to reduce the need for extensive training and knowledge to perform wheel alinement operations, to provide the operator or mechanic a convenient and expeditious manner of checking alinement and to provide him with means for conveniently ascertaining the amount of adjustment required to cure misalinement.

This invention is directed particularly to simplification of camber and caster determination, inasmuch as turning radius and toe-in determination are already quite simple, and steering axis inclination and turning radius are not stressed, particularly for passenger cars, since they are non-adjustable angles.

A factor contributing to the invention resides in the analysis that despite the fact of wide variation in overall alinement specifications, the factory tolerances of both camber and caster for many vehicles are the same or overlap, and that the majority of vehicles can be grouped according to their camber and caster tolerances into a relatively small number of groups. For example, we have found that of the approximately 250 different passenger car entries in the master chart covering the model years 1950–1961, most entries can be classified as to both of camber and caster into only fourteen groups, i.e., fourteen groups of cars which in their respective groups have both the same or substantially the same camber and the same or substantially the same caster.

The above factors contribute to the commercial feasibility and practicality of the invention, in terms especially of economy, convenience and simplicity, and the crux of the invention resides in the provision of replaceable indicia or indicators for wheel alinement apparatus incorporating as their principles the said factors.

Specifically, it is the object of the invention to provide, for substantially any given style or type of apparatus for indicating geometric relationships of vehicle steering wheels, a set of interchangeable or replaceable indicia means each of which is correlated to a respective one of classified groups of vehicles, each face accommodating exposure there-through or thereon of the indicating means for at least one criterion of wheel alinement and bearing delineations or indicia correlated to the indicating means and to factory specifications of the criterion for the respective group of vehicles, said delineations or indicia depicting no more than the specifications for the criterion and the adjustments required to attain specifications.

In a preferred embodiment, the invention is applied to a spirit level type of gauge adapted to be secured to a vehicle wheel and having a pair of spaced parallel spirit levels extending generally perpendicular to the vehicle wheel for indicating wheel camber and caster, respectively. For use with such gauge, in the fourteen group example above given, we provide seven interchangeable indicator cards or plates for the gauge, the opposite faces of each of which bear indicia thereby to provide fourteen indicia faces each correlated to a respective one of the groups. Each card is of a size to overlie the gauge face and has a pair of spaced parallel openings, windows, or slots therein to reveal the two spirit levels. Preferably, the openings are sufficiently narrow to reveal only the levels and not any indicia which may appear on the dial face of the gauge per se. Adjacent the edges of each opening we provide delineated areas or lines which, instead of reading in degrees or other numerical values, are simply areas correlated to the factory specified tolerances for camber and caster, respectively. If, after appropriate manipulation of the gauge and/or the wheel to secure readings of wheel camber and caster, the spirit level bubbles are within the delineated areas, the wheel has the correct camber and caster. If not, the wheel is out of alinement.

The result is a very simple yet reliable check of wheel alinement. The check is made rapidly under such conditions that even a vehicle owner may view the whole operation. When the test is finished, the gauge itself tells the mechanic and the motorist the wheel camber and caster, and the reading is simplified to the essential requirements, i.e., "in alinement" or "out of alinement." This check, coupled with the quick simplified determination of toe-in (and turning radius if desired) tells the whole story of alinement or mis-alinement.

The work required of the operator is greatly reduced, even a novice mechanic can be confident of the test, the element of suspicion or apprehension is eliminated and customer satisfaction results. To make the check, the mechanic simply selects the proper one of the fourteen indicia faces, places the same on the gauge and runs his check. The necessity for extracting numerical specifications from a chart, entering numerical specifications on a record and comparing readings to specifications is eliminated; and the mechanic is no longer suspected of mysterious manipulations.

To insure attainment of the stated advantages, we prefer to print on the indicia means the makes, models and years of respective cars to which each is applicable, the instructions for securing camber and caster readings and the fact that position of the bubbles in both delineated areas means "in alinement" and disposition of either bubble outside the respective areas means "out of alinement." By virtue of the foregoing, all specifications, instructions and information are embodied directly in the indicia means and there is no need for reference to extraneous literature, charts, books, etc.

Another object of the invention is to equip the gauge and the indicia means with cooperable mounting and locating means whereby an indicia means may quickly be mounted on a gauge with its openings and delineations automatically alined and correlated with the spirit levels or other indicating means.

An additional object of the invention is to provide the indicia means with instructions to the mechanic as to how mis-alinement may be cured. For example, many modern cars embody wheel alinement adjusting means comprising replaceable shims. For such cars, the indicia means may bear delineations instructing the mechanic to remove one or more shims from one or more places and/or to add one or more shims in another one or more places.

A further object of the invention is the application of the invention to substantially all types of wheel alining apparatus, including projected light beam and remote signaling types for indicating any or all of the five alinement criteria, protractor and pendulum types, and single as well as multiple spirit level types.

Other objects and advantages of the invention will become apparent in the following detailed description.

Now, in order to acquaint those skilled in the art with the manner of making and using our wheel alinement indicators, we shall describe, in connection with the accompanying drawings, preferred embodiments of our indicators and preferred manners of making and using the same.

In the drawings:

FIGURE 1 is a plan view of a wheel alinement gauge to which our invention is particularly applicable;

FIGURE 2 is a plan view of one indicia face of one indicator formed in accordance with our invention for use in conjunction with the gauge of FIGURE 1;

FIGURE 3 is a side elevation of the indicator of FIGURE 2 mounted on the gauge of FIGURE 1;

FIGURE 4 is a top plan view of a modification of the indicator of FIGURE 2;

FIGURE 5 is a bottom plan view of the indicator of FIGURE 4;

FIGURE 6 is a plan view of another modification of the indicator of the present invention; and FIGURE 7 is an elevational view of indicia or indicator means provided according to the present invention for remote indicating wheel alinement apparatus.

Referring now to the drawings, and particularly to FIGURE 1 to 3, we have shown the application of a preferred embodiment of our indicator means to a wheel alinement gauge 10 comprising a body adapted to be mounted on a vehicle wheel and carrying three spirit levels 12, 14 and 16 and associated indicator scales for respectively indicating the camber, caster and steering axis inclination of vehicle wheels. The camber indicating level 12 and the caster indicating level 14 are disposed in spaced parallel relation to one another to be located generally normal to the plane of the wheel and the steering axis inclination level 16 extends transversely of the levels 12 and 14 forwardly thereof to be disposed parallel to the plane of the wheel. The construction and mode of operation of this gauge are disclosed in detail in the co-pending application of Charles W. MacMillan, Serial No. 81,762, filed January 10, 1961, now Patent No. 3,071,863.

The type of gauge shown in FIGURE 1 is customarily employed in conjunction with wheel supporting turntable means, most of which are equipped with highly simplified scales for indicating turning radius. Consequently, the turning radius angles can readily be ascertained if desired when manipulating the wheels to secure the caster readings, and we therefore do not concern ourselves with turning radius in applying our invention to this gauge. Likewise, toe-in is determined by a separate instrument of a highly simplified and easily used nature, and we do not now concern ourselves with indicia means therefor, although toe-in should be determined in checking wheel alinement. For passenger cars at least, we do not stress steering axis inclination as it is a non-adjustable angle. Consequently, with the gauge of FIGURE 1, our essential objective is to simplify and facilitate determination and correction (when necessary) of camber and caster.

For cooperation with the gauge 10, we provide interchangeable or replaceable indicia means in the form of cards or plates, one of which is shown at 20 in FIGURES 2 and 3. The card, which may be made of any durable lightweight sheet material, such as cardboard, plastic, aluminum, etc., is preferably of the same configuration as the face of the gauge 10 and is adapted to overlie and cover all of the indicia on the gauge face. Due to the irregular configuration of the gauge face and the corresponding configuration of the card, the card may readily be alined in proper position relative to the gauge. To center the card on the gauge, cooperable centering or detachable mounting means are provided on the card and the gauge body. Specifically, the gauge body is provided adjacent its corners with upstanding shouldered pins or studs 18 and the card 20 is provided adjacent its corners with complementary apertures 21. If the card is formed of cardboard or a like material, the apertures are preferably defined and protected by eyelets, grommets or the like, as shown. By simply pressing the card down on the gauge until the studs 18 extend through the apertures 21 and the card rests on the stud shoulders, the card is properly mounted on the centered relative to the gauge and its spirit levels.

Since we are primarily interested in the camber and caster indicating means of the gauge 10, we provide a pair of spaced parallel windows or slots 22 and 24 in the card 20 of a length, width and location to exactly complement and overlie the spirit levels 12 and 14, respectively, while the body of the card covers or blocks from view the indicia on the gauge face. While the spirit level 16 could similarly be revealed, we prefer to avoid unnecessary revelation and a possible source of confusion, at least in the passenger car field, and therefore prefer to block from view the level 16. However, we do provide a small aperture 26 in the card alined with the central part of the level 16 to facilitate leveling of the gauge body by the mechanic when checking camber and caster.

On each face thereof (only one of which is shown), the card 20 bears certain indicia, delineations and/or delineated areas facilitating use of the card. A first indicium comprises an identifying numeral 31, suitably in one corner of the card, for facilitating selection of the card from a master list, which is considerably abbreviated from the master chart previously employed. Second indicia 32 enumerate the vehicles to which the card is applicable, e.g., all models of Buicks for the model years 1957 through 1961, all models of Cadillac for the model years 1957 through 1960, all models of Lincoln for the model years 1952 through 1960, all models of Mercury for the model years 1954 through 1956, all 1958 Chryslers having manual steering (MS), etc.

Adjacent the slot 22 revealing the camber indicating spirit level 12 instructions, indicated at 33, are given for checking camber. With the gauge shown in FIGURE 1, camber is read directly with the wheels straight and on level ground. If the wheel being checked is properly adjusted as to camber, the bubble of the spirit level 12 will aline itself with delineations or delineated areas, indicated at 34, provided to opposite sides of the slot 22 and immediately contiguous thereto, which areas are identified on the prefered embodiment of the card as shaded areas. In design and manufacture of the card, the areas 34 are carefully correlated to the spirit level 12 of the gauge, the bubble in the level and the factory specifications of the automobile manufactureres. For example, if the manufacturer of Buick automobiles recommends for model years 1957–1961 a camber setting of positive 3/8 degree with a permissible range of negative 1/2 degree to plus 1 degree, the area 34 could have a span so correlated to the bubble in the spirit level as to correspond to the preferred setting without exceeding the permissible span.

Consequently, if the bubble were entirely or principally within the shaded area, the camber seting would be satisfactory, while if the bubble were principally or entirely outside the shaded area, the wheel would be out of alinement.

In similar fashion, instructions 35 are printed adjacent the slot 24 revealing the caster indicating spirit level 14, and delineated and preferably shaded areas 36 are provided contiguous to the slot. With the gauge shown in FIGURE 1, wheel caster is ascertained by swinging or turning the wheel inwardly 20 degrees from its straight ahead position, adjusting the level 14 (by means of the thumb screw 15 shown in FIGURE 3) to position its bubble at zero on the caster scale, swinging the wheel outwardly through an arc of 40 degrees to a position wherein it is turned 20 degrees out from straight ahead, and reading the position of the bubble relative to the scale. To facilitate adjustment of the level to zero with the card in place, the card is provided with separately distinguishable delineations 37, suitably spaced parallel lines bridging the zero on the caster scale, extending to both sides of the slot 24 and of red color to contrast with otherwise black indicia. As with the camber check, but subsequent to wheel manipulation in accordance with the instructions 35, the compliance of the wheel with factory recommendations or specified tolerances for caster is ascertained simply by looking to see if the bubble of the level 14 is alined with or principally within the area 36, or is entirely or principally outside said area.

Relative to one or the other of caster and camber, vehicle manufacturers specify different settings for the left and right steering wheels to compensate for the customary crown of roads, so that the vehicle will track straight ahead despite the crown. In the case of the passenger cars listed on the indicator cards shown in FIGURE 2, it is recommended that camber be the same for both wheels and that the caster of the left wheel be greater (i.e., more positive or more toward positive) than that of the right wheel by 1/2 degree. To facilitate automatically the checking of caster in accordance with such differential in specifications, we provide delineated areas 36 comprised of a pair of longitudinally staggered areas 36-r and 36-l disposed to opposite sides of the slot 24 and labeled respectively as being for the right wheel and the left wheel. In like manner, the indicator face shown in FIGURE 4 is equipped with staggered caster specifying areas. On the other hand, if the manufacturer specifies the same caster for both wheels and recommends a differential in camber to compensate for road crown, the caster specification areas may be alined with one another and the camber specification areas may be staggered, as on the indicator face shown in FIGURE 5. This would of course be a different card face from the face "1" shown in FIGURE 2.

In actual practice, we have found that the vast majority of passenger cars on the country's roads today can be classified according to both caster and camber in fourteen groups. Consequently, by providing seven indicator cards like the card 20, and printing on both sides thereof, we afford fourteen indicia faces to facilitate checking of wheel alinement on the vehicles in current operation. The complete group of cards is less than 1/2 inch thick and very readily and conveniently stored and used.

When using this compact group of indicator cards in conjunction with the gauge 10, the mechanic first selects the proper indicator face for the vehicle to be checked. This may be done by riffing through the cards and referring to the indicia 32, or by consulting the master sheet listing vehicles and the respective face numbers therefor and selecting the face by reference to the indicia 31. The card is then mounted on the gauge with the selected face up by alining the same with the gauge body and pressing the two together to cause the pins 18 to pass through the apertures 21 until the card rests on the shoulders of the pins. The gauge and card may then be examined by the customer, who can quickly ascertain the applicability of the selected indicator face to his car and the tests to be performed by scanning the indicia 32, 33 and 35. The mechanic may then apply the gauge in sequence to the two steering wheels of the automobile and perform relative to each the tests per the instructions 33 and 35. The customer may observe these tests and the proper performance of the same, and himself observe the position of the spirit level bubbles upon completion of each test thereby to have the satisfaction of knowing that his car is in or out of alinement.

In addition to the foregoing, it is an object of this invention not only to provide the mechanic and the customer with means for ready, convenient and accurate ascertainment of the condition of the steering wheel suspension, but also to provide the mechanic with means for quickly and conveniently ascertaining the correction required should the wheels be out of alinement. Specifically, we provide to opposite sides of each of the delineated areas 34, 36-r and 36-l delineations 34-s, 36-rs and 36-ls, respectively, correlated to the spirit levels 12 and 14 and the corrective means of the vehicles listed by the indicia 32. In the case of the indicator face shown in FIGURE 2, the listed vehicles are equipped with shims for facilitating setting and adjustment of wheel camber and caster, and we have correlated the delineations 34-s, 36-rs and 36-ls to the correction effect of shims in increments of 1/16 inch thickness, and so specify on the card by a statement 38 to such effect. Also, we provide on the card camber correcting instructions 33-s and caster correcting instructions 35-s telling the mechanic how to make the corrective adjustments, i.e., where to add and where to remove corrective shims.

An alternative to the card 20 of FIGURE 2 is shown at 120 in FIGURES 4 and 5, FIGURE 4 revealing one face of the card and FIGURE 5 revealing the opposite face. Essentially, the card 120 is the same as the card 20 with the principal exception that longitudinally movable slide 140 has been embodied in the card. Also, we have illustrated the card 120 as having windows or transparent areas 122, 124 and 126 therein as contrasted to the open slots 22, 24 and 26 of FIGURE 2. Delineations corresponding to 34, 36-*l*, 36-*r* and 37 are indicated at 134, 136-*l*, 136-*r*, and 137, respectively. For convenience of disclosure, we have omitted from FIGURES 4 and 5 printed matter corresponding to the indicia indicated at 32, 33, 35 and 38 in FIGURE 2. In general, the manner of use of the card 120 is similar to that of the card 20, except for determination of caster correction when using face "4" and camber correction when using face "5."

When using face "4" of the card 120, camber and caster are checked in essentially the same manner as described in conjunction with FIGURES 1 to 3, with the exception that the slide 140 is employed to determine caster correction. The slide 140 may be slidably mounted on the card in any desired manner, or may be slidably sandwiched between two sheets of the material forming the card, as indicated in FIGURES 4 and 5. The slide is alined with the window 124 and is reciprocable longitudinally thereof. To facilitate manual reciprocation of the slide, the same projects outwardly beyond the base of the card. Preferably, the slide itself is transparent for revealing the bubble of the spirit level lying therebelow when the card is in use. On its face, as revealed through the window 124, the slide 140 bears a pair of transverse lines 141 which lie adjacent the delineated areas 136-*l* and 136-*r* and are spaced by a distance equal to the length of the spirit level bubble, and a cross hair 142 spaced from the lines 141 and adapted for cooperation with scales 143-*l* and 143-*r* printed on the card to opposite sides of the window 124 in spaced relation to the areas 136. In brief, the scales 143-*l* and 143-*r* correspond to the corrective indicia 36-*ls* and 36-*rs* of FIGURE 2.

After manipulating the vehicle wheel to check caster, the mechanic may quickly ascertain the amount of correction required and the manner in which correction is to be effected by manipulating the slide 140 to center the spirit level bubble between the delineations 141 on the slide and by referring to the position of the hair line 142 relative to the respective one of the scales 143, i.e., the scale 143-*l* if the left wheel is under test and the scale 143-*r* if the right wheel is under test. By virtue of the slide 140, the determinative areas 136 are separated from the corrective delinations or markings, thereby to mitigate the possibility of confusion.

By turning the card 120 over from its FIGURE 4 position to its FIGURE 5 exposure, side "5" of the card becomes available for use and the window 124 and the slide 140 becomes associated with the camber indicating level of the gauge, instead of the caster indicating level. By providing staggered camber checking area 134-*l* and 134-*r* and camber correcting scales 145-*l* and 145-*r* on the "5" side of the card, the slide 140 may be manipulated in the manner above described to ascertain camber corrections for vehicles wherein a differential in camber rather than caster is specified to compensate for road crown. The slide, of course, is not limited to use in conjunction with staggered delineations, but can be used in conjunction with alined delineations such as 134 of FIGURE 4 and 136 of FIGURE 5. In fact, the card could be equipped with two such slides associated respectively with the windows or slots 122 and 124.

A further and highly advantageous application of the slide is depicted in FIGURE 6. The principle involved is particularly applicable to the caster indicating level 14 of the gauge because of the adjustability of that level. For convenience of disclosure, we have illustrated in FIGURE 6 a card 220 embodying this principle in its application just to caster. The card 220 is essentially the same in physical construction as the card 120 and includes a reciprocable transparent slide 240 alined with the caster level revealing window 224. Along the opposite sides of the window, the card bears a plurality of sets of indicia or delineations (indicated by the suffixes *a*, *b*, *c* and *d*) each including a longitudinally spaced pair of readily distinguishable "zero" defining lines 237*a*, 237*b*, 237*c* and 237*d*, respective delineated areas 236-*la*, 236-*lb*, 236-*lc* and 236-*ld* on one side of the slot and respective delineated areas 236-*ra*, 236-*rb*, 236-*rc* and 236-*rd* on the other side of the slot. Associated with each such set are indicia 232*a*, 232*b*, 232*c*, and 232*d* stating the vehicles to which each respective set is correlated. As will be appreciated, 236-*la*, 236-*lb*, etc., are the caster specifications for the left wheels and 236-*ra*, etc., are the specifications for the right wheels of the respective groups of vehicles. On the slide, we provide a pair of cross lines or delineations 241 which by reciprocation of the slide are selectively alinable with the "zero" lines 237*a*, 237*b*, 237*c* and 237*d*. In use, the operator in checking, for example a Pontiac, alines the marks 241 on the slide 240 with the marks 237*c* and places the gauge on the car. He swings the wheel inward 20 degrees and then manipulates the thumb screw 15 to center the bubble in the level 14 between the hair lines 241. Then, he swings the wheel outwardly through an arc of 40 degrees. If he is checking the left wheel, he looks to see if the bubble falls within the area 236-*lc*. If the right wheel is being checked, the bubble position is compared to area 236-*rc*. Thus, by appropriate selective corresponding use of all four sets of the marks, a wide variety of cars having widely variant caster specifications can be checked expeditiously and conveniently from a single card. For example, we have shown in FIGURE 6 the caster specifications for 1961 Chryslers and Plymouths with power steering (plus ¾ degree or minus ½ degree) for 1961 Chryslers and Plymouths with manual steering (minus ½ degree plus or minus ½), for 1961 Pontiacs (negative 1½ degrees plus or minus ½ degree), and for 1961 Fords (minus ½ degree to plus ½ degree) and Chevrolets (zero plus or minus ½).

To provide an indication of the amount of the correction required and the manner in which correction is to be effected, we may print suitable indicia or delineations on the card as in the previously described embodiments of the invention. Alternatively, and preferably, we may employ the slide 240 for this purpose by placing corrective indicia or delineations 248 on the slide to opposite sides of the zero lines or marks 241, centering the marks 241 on the respective one of the areas 236 after the test has been made, and viewing the position of the bubble relative to the lines 248.

In the foregoing, we have referred particularly to the gauge shown in FIGURE 1 and have illustrated interchangeable or replaceable indicator cards particularly adapted to this gauge. From the description, it will be obvious to those skilled in the art that the replaceable cards may be employed to reveal all three of the levels or any selected one or two of the levels as desired; that one card may reveal one selected level, another may reveal another selected level, a third may reveal two levels, a fourth three levels, etc. It will also be obvious that the invention is readily applicable to single and double spirit level gauges, and to protractor and/or pendulum type wheel alinement gauge means.

Moreover, the invention is particularly suited to remote indicating wheel alinement apparatus, whether it be of the projected light beam type, scale illuminating type, or remote mechanical indicator type. By way of example, we have shown in FIGURE 7 indicia means for a scale illuminating type of alinement apparatus. One form of such apparatus is disclosed in detail in United States Letters Patent 2,765,540 and 2,923,067 to Charles W. McMillan, Harold Holaday and Frank Pierce. Briefly, the apparatus comprises gauge heads applicable to the vehicle steering wheels and including relatively movable elements which move in predetermined correlation to varying angles of camber, caster, toe-in and king pin or steering axis inclination. As the movable elements move relative to one another, they cause variation in an electrical circuit element, such as a resistor, which element is coupled to a galvanometer located in a remote cabinet. The galvanometer in turn carries a mirror disposed between a light source and a translucent screen whereby variation in circuit resistance causes variation in the position on the screen of a spot of light reflected thereon by the mirror. The translucent screen bears a plurality of scales illuminated by the reflected spot of light thereby to indicate on respective scales wheel camber, caster, steering axis inclination and toe-in. For cooperation with this apparatus, we provide the indicator or indicia means of FIGURE 7. Since the apparatus usually includes two screens, one for the left wheel and one for the right wheel, we provide a pair of indicia means for cooperation respectively with the two screens. These may take a variety of integral or separate forms, such as continuous or separate films in strip or roll, etc., or may comprise interchangeable cards each including a right wheel indicator and a left wheel indicator as shown in FIGURE 7.

The card means of FIGURE 7 comprises a pair of card faces 320-*l* and 320-*r* for the left and right hand screens of the alinement apparatus. Each card is preferably opaque except for a plurality of transparent or translucent windows or open slots 322, 323 and 324 therein adapted to be alined with selected respective scales on the apparatus screens. For example, we have shown a window 322 to be alined with the camber scale, a window 324 to be alined with the caster scale and a window 323 to be alined with the toe-in scale of the apparatus. Contiguous to the opening 322 in each card, we provide a delineated area 334 correlated to the indicating means of the apparatus and to the camber specifications of the vehicles to which the card is correlated. We also preferably provide corrective indicia 334-*s* like the previously described indicia 34-*s*. In use, the light illuminating the translucent screens of the apparatus will be visible through the opening 322 in each card, whereby the spot of light may be compared to the area 334 to reveal the camber condition of each steering wheel. In like manner, the cards are provided adjacent the opening 324 with delineated caster depicting areas 336 and caster corrective indicia 336-*s*. As shown, the caster area 336-*r* on the right wheel card has a different spacing from zero than the area 336-*l* on the left hand card automatically to incorporate the compensation for road crown. For toe-in, we preferably provide delineated areas on each card, namely, a solid area 339 indicating proper toe-in for a respective wheel when the other wheel is straight ahead and a shaded area 339-*s* indicating proper toe-in of each wheel when the car is tracking straight ahead, i.e., with both wheels toed-in. As with the card 20 shown in FIGURE 2, the card set 320 includes identifying indicia 331 and 332 and instructive indicia 333-*s* and 335-*s*. If desired, other instructive indicia such as that indicated at 33, 35 and 38 in FIGURE 2 could be provided.

Accordingly, the principles of the invention are seen to be applicable with full effect and advantage to all styles and types of wheel alinement apparatus, including those providing for indication of toe-in, as well as caster and camber. Also, the invention is applicable to ascertainment of steering axis inclination and turning radius should that be desired. In all embodiments, the invention provides a clear, uncomplicated, readily understood indication of the condition of vehicle wheels as either being "in alinement" or "out of alinement" and greatly facilitates the work of the mechanic both in checking alinement conditions and in providing the mechanic directly on the card with all the information he requires without need for reference to extraneous literature, books, charts, etc. Thus, all of the objects and advantages of the invention have been shown herein to be attained in a convenient, economical and practical manner.

It will be apparent that while we have referred herein to indicator cards, physical forms of indicia other than cards may be employed as desired. For example, strips or rolls of plastic film many prove advantageous, and strips or rolls of photographic film may prove ideal in conjunction with projected light beam wheel alinement apparatus.

Accordingly, while we have shown and described what we regard to be the preferred embodiments of our invention, it is to be appreciated that various changes, rearrangements and modifications may be made therein without departing from the scope of the invention, as defined by the appended claims.

We claim:

1. In vehicle wheel alining apparatus having means for indicating at least one criterion of wheel alinement, the improvement comprising replaceable indicators for said means correlated to respective vehicles and including at least one delineated area cooperable with the indicating means and correlated to specifications of the criterion for the respective vehicles, other delineations cooperable with the indicating means and correlated to adjustments required to attain the specifications, and a shiftable slide adjacent the delineated area and said other delineations having a first delineation alinable with said indicating means and a second delineation cooperable with said other delineations to indicate the adjustments required if any.

2. In vehicle wheel alining apparatus having means for indicating at least one criterion of wheel alinement, the improvement comprising replaceable indicators for said means correlated to respective vehicles and including first delineations cooperable with the indicating means and correlated to factory specifications of the criterion for the respective vehicles, and a shiftable slide adjacent the first delineations having second delineations thereon alinable with said first delineations and third delineations thereon cooperable with said indicating means to indicate adjustments required if any.

3. In vehicle wheel alining apparatus having means for indicating at least one criterion of wheel alinement; replaceable indicia for said means correlated to respective vehicles and comprising a pair of relatively shiftable members, one operatively associtated with the indicating means and the other shiftable relative thereto; said shiftable member having first delineations thereon cooperable with said indicating means and comprising therewith a first indicator, and second delineations thereon correlated to said first delineations; said one member having third delineations thereon correlated to said indicating means and cooperable with said second delineations, and comprising therewith a second indicator; one of said indicators comprising reference means; the other of said indicators comprising correction means correlated to the specifications of the criterion for the respective vehicles and denoting adjustments required to attain such specifications.

4. Vehicle wheel alining apparatus comprising, in combination, a gauge to be attached to the wheel and including means for determining at least one criterion of wheel alinement, an indicator operatively associated with said means and including a scale plate having a slot therein revealing said indicator and having scale marks thereon adjacent said slot for indicating the value of said criterion, at least one replaceable scale plate for said indicator correlated to respective vehicles and adapted to overlie said first-named scale plate, said replaceable scale plate having a slot therein substantially coextensive with the slot in said first-named plate, means for mounting said replaceable scale plate on said first-named scale plate with the slots thereof in alinement with one another to aline the replaceable scale plate with said indicator, said replaceable scale plate including a scale adjacent the slot therein co-operating with said indicator and comprising first indicia correlated to the factory specification of the criterion for the respective vehicle and co-operable with said indicator to indicate compliance with the factory specification, and second indicia disposed to opposite sides of said first indicia and co-operable with the indicator to indicate the amount of correction required and the manner in which to effect such correction when the criterion is not in compliance with the factory specification.

5. Vehicle wheel alining apparatus comprising, in combination, a gauge to be attached to the wheel and including means for determining at least one criterion of wheel alinement, an indicator operatively associated with said means and including a scale plate having a slot therein revealing said indicator and having scale marks thereon adjacent said slot for indicating the value of said criterion, at least one replaceable scale plate for said indicator correlated to respective vehicles and adapted to overlie said first-named scale plate, said replaceable scale plate having a slot therein substantially coextensive with the slots in said first-named scale plate, means for mounting said replaceable scale plate on said first-named scale plate with the slots thereof in alinement with one another to aline the replaceable scale plate with said indicator, said replaceable scale plate including indicia adjacent the slot therein co-operating with said indicator and comprising indicia paralleling an area of said slot and correlated to the factory specified tolerances of the criterion for the respective vehicle and co-operable with said indicator to indicate compliance with factory specifications.

6. Vehicle wheel alining apparatus for alinement of vehicles including corrective shims comprising, in combination, a gauge to be attached to the wheel and including means for determining at least one criterion of wheel alinement, an indicator operatively associated with said means and including a scale plate having a slot therein revealing said indicator and having scale marks thereon adjacent said slot for indicating the value of said criterion, at least one replaceable scale plate for said indicator correlated to respective vehicles and adapted to overlie said first-named scale plate, said replaceable scale plate having a slot therein substantially coextensive with the slot in said first-named scale plate, means for mounting said replaceable scale plate on said first-named scale plate with the slots thereof in alinement with one another to aline the replaceable scale plate with said indicator, said replaceable scale plate including a scale adjacent the slot therein co-operating with said indicator and comprising first indicia correlated to the factory specification of the criterion for the respective vehicle and co-operable with said indicator to indicate compliance with the factory specification, and second indicia comprising spaced lines disposed to opposite sides of said first indicia and co-operable with the indicator to indicate the amount of shims required for correction and the manner in which to manipulate the shims to effect such correction when the criterion is not in compliance with the factory specification.

7. Vehicle wheel alining apparatus comprising, in combination, a gauge to be attached to the wheel and including first means for indicating wheel camber and second means for indicating wheel caster, indicator means operatively associated with each of said first and second means and including a scale plate having slots therein revealing said indicator means and having scale marks thereon adjacent each of said slots for indicating camber and caster respectively, at least one replaceable scale plate for said indicator means correlated to respective vehicles and adapted to overlie said first-named scale plate, said replaceable scale plate having slots therein corresponding to and substantially coextensive with the slots in the first-named scale plate, means for mounting said replaceable scale plate on said first-named scale plate with the respective slots thereof in alinement with one another to aline the replaceable scale plate with said indicator means, said replaceable scale plate including a scale adjacent each slot therein co-operating with said indicator means, each scale on said replaceable scale plate comprising first indicia correlated to the factory specification of the respective one of camber and caster for the respective vehicle and co-operable with the respective indicating means to indicate compliance with the factory specification, and second indicia disposed to opposite sides of said first indicia and co-operable with the respective indicating means to indicate the amount of correction required and the manner in which to effect such correction in the respective one of camber and caster when the wheel is not in compliance with the factory specification.

References Cited by the Examiner
UNITED STATES PATENTS

| | | | |
|---|---|---|---|
| 1,477,450 | 12/1923 | Sandbo | 33—203.20 |
| 1,487,759 | 3/1924 | Skinner | 33—203.14 |
| 2,003,556 | 6/1935 | Saballus | 33—180 |
| 2,249,226 | 7/1941 | Peters | 33—46.2 |
| 2,628,430 | 2/1953 | Krumm | 33—203.18 |
| 2,645,860 | 7/1953 | Bender et al. | 33—203.18 |
| 2,732,626 | 1/1956 | Knight | 33—203.2 |

OTHER REFERENCES

Product Engineering Magazine, vol. 30, No. 19, May 11, 1959, "9 ways to align mating parts," pages 88 and 89, page 88 relied on.

ISAAC LISANN, *Primary Examiner.*

ROBERT EVANS, *Examiner.*